G. B. McCRACKEN
VALVE.
APPLICATION FILED FEB. 26, 1919.
1,333,623.
Patented Mar. 16, 1920.
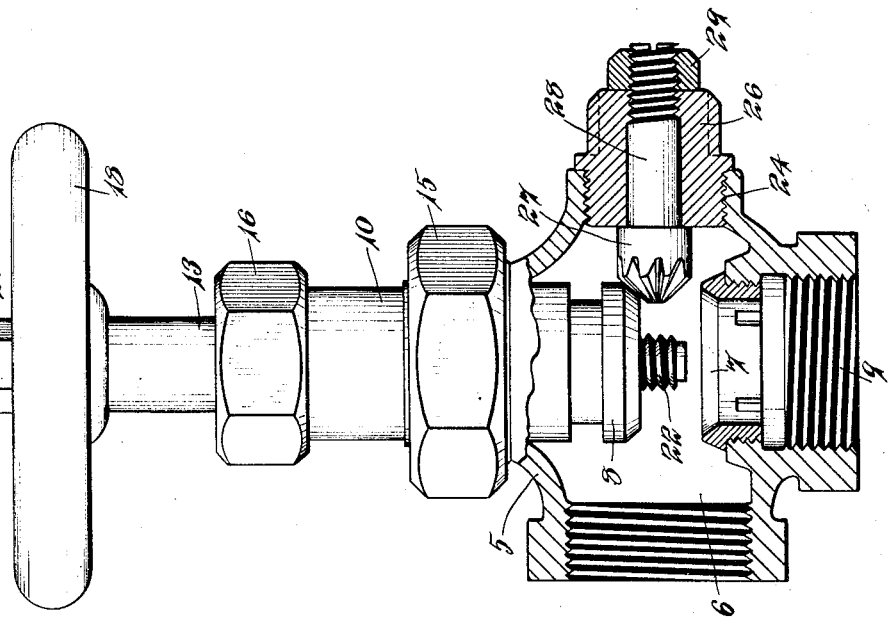
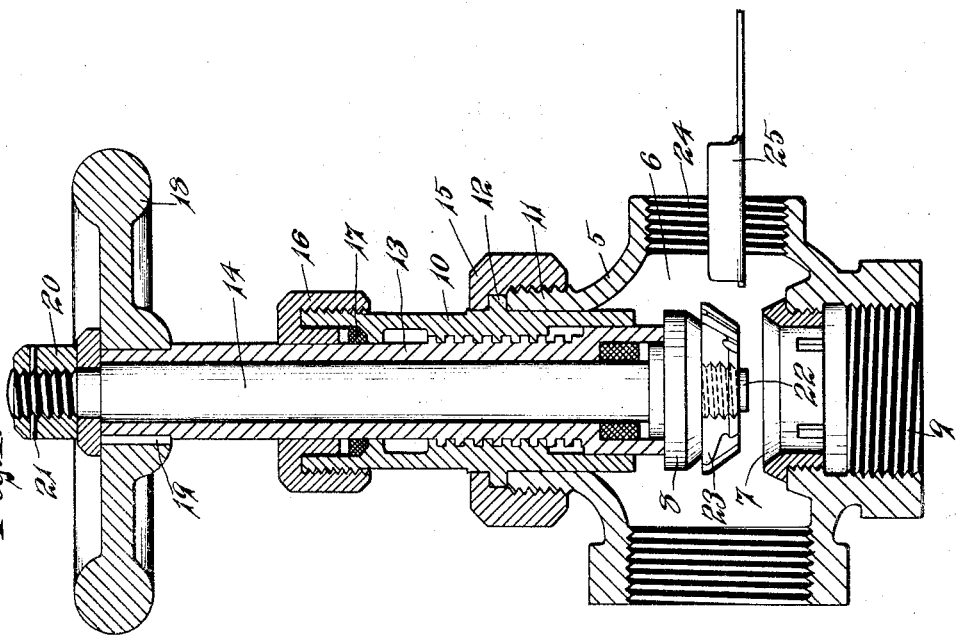
INVENTOR.
George B. McCracken,
BY Arthur B. Jenkins,
ATTORNEY.

UNITED STATES PATENT OFFICE.

GEORGE B. McCRACKEN, OF WILLIMANTIC, CONNECTICUT.

VALVE.

1,333,623.

Specification of Letters Patent.  Patented Mar. 16, 1920.

Application filed February 26, 1919. Serial No. 279,443.

*To all whom it may concern:*

Be it known that I, GEORGE B. MC-CRACKEN, a citizen of the United States, and a resident of Willimantic, in the county of Windham and State of Connecticut, have invented a new and Improved Valve, of which the following is a specification.

My invention relates to the class of devices employed to control the flow of fluids through pipes, and especially to that class of valves in which the valve plunger, attached to the end of a rotatable spindle, as by means of screw threads, is caused to be moved with respect to its seat by the operation of said spindle, and an object of my invention, among others, is to provide a device of this class with means whereby the valve plunger and the valve seat may be reformed in a simple and expeditious manner to fit one another.

One form of device embodying my invention and in the construction and use of which the objects herein set out, as well as others, may be attained, is illustrated in the accompanying drawings, in which—

Figure 1 is a view in central longitudinal section through a valve embodying my invention showing the operation of reforming the valve seat.

Fig. 2 is a similar view showing the operation of reforming the valve plunger, the section being partial.

In the accompanying drawings the numeral 5 indicates a valve body having a valve chamber 6 with inlet and outlet openings thereto and therefrom and 7 denotes the valve seat against which the valve head or plunger 8 is adapted to be pressed to prevent flow of fluid through the opening 9.

In the use of valves of this class the meeting faces on the valve head and seat soon become worn and it then becomes necessary to refit them to make them tight. Various means have been employed to accomplish this result, such means effecting a grinding action between the valve head and plunger and the valve seat, a valve heretofore constructed by me to effect this purpose comprising an interiorly threaded feeding sleeve 10 projecting within the neck 11 of the valve body and having a flange 12 seated against the end of said neck. A valve spindle sleeve 13, provided with an exterior thread to fit the thread within the sleeve, receives a valve stem or spindle 14 extending through the sleeve and supporting the valve head 8 at its lower end. A screw threaded cap 15 engages the screw threaded neck 11 and holds the flange 12 against the end of said neck to secure the sleeve 10 in place. A gland nut 16 is secured to the outer screw threaded end of the sleeve in a manner to press a packing 17 in place and a hand wheel 18 is secured, as by means of a key 19, to the screw threaded end of the sleeve 13. A nut 20 is screwed on to the end of the stem or spindle 14 and a pin 21 locks the nut to the spindle. All of the parts above described are of old and well known construction and except in combination with parts to be hereinafter described, form no part of the present invention.

In carrying out my invention a screw threaded tip 22 is extended below the valve head 8 for the purpose of attachment thereto of a reforming cutter 23 in a manner as illustrated in Fig. 1 of the drawings. The valve body is provided with an opening 24 located opposite the valve head in position for access to said head. In the operation of affixing the cutter 23 a holder 25 having a lipped groove to removably receive the cutter is inserted through the opening 24 to an extent to locate the threaded hole in the cutter in line with the tip 22 so that said tip, on being rotated, as by means of the hand wheel, will be screwed into the cutter, after which the holder may be slipped from the cutter and withdrawn through the hole or opening.

When the cutter has been secured to the tip 22 it may be moved into engagement with the valve seat 7 by means of the hand wheel rotating the sleeve 13 to feed the parts downward, and a handle of suitable form being applied to the nut the spindle may be turned to impart cutting action of the cutting tool, the hand wheel 18 being employed to continue the feeding movement of the tool during this cutting operation.

As a further step in carrying out my invention the hole 24 is preferably threaded to receive a support 26 for a valve head cutting tool 27 secured in the support in any suitable manner. As shown herein this tool has a shank 28 threaded to receive a nut 29, and the end of the shank may be slotted to receive a screw-driver by means of which the cutter may be rotated if desired, the slot also serving as a means for denoting the proper position of the cutter when a single blade is used therein.

This construction enables the cutter to be located close to the valve head and thus to be rigidly held for cutting operations, the cutting tool being located in position for the purpose and the valve spindle and sleeve being operated as hereinbefore described to feed the head against the tool and to rotate the head for cutting operations.

By this means the contacting surfaces between the valve head and seat may be quickly and accurately reformed by the cutting tools and such tools being supported upon operative parts of the valve in relative positions occupied when in use, enable this accuracy to be obtained and the means for attaching the cutting tools to the valve structure enables the operation to be performed without removing the valve from its position attached to a line of pipe.

In accordance with the provisions of the patent statutes I have described the principles of operation of \my invention, together with the device which I now consider to represent the best embodiment thereof; but I desire to have it understood that the device shown is only illustrative and that the invention may be carried out by other means within the scope of the appended claims.

I claim—

1. A valve body having a valve seat, a valve spindle mounted in the body and having a valve head to fit said seat and a projecting tip to receive a cutting tool, means for imparting feeding movement to the spindle, means to impart separate rotating movement thereto, and a cutting tool secured to said tip to operate upon said seat.

2. A valve body having a valve seat, a sleeve mounted in the body and having feeding movement therein, a valve spindle secured within the sleeve and having rotative movement independently thereof, a valve head at the end of the spindle, and a tip having means to receive and hold a tool underneath the head for cutting purposes.

3. A valve body having a plurality of openings therein, a valve spindle secured in one of said openings and having a valve head secured at the end thereof, means for supporting a cutting tool within another of said openings, and means for causing relative feeding movement between the valve head and said cutting tool.

4. A valve body having a plurality of openings therein, a valve spindle secured to the body within one of said openings, a valve head secured to said spindle, a tool support secured within another of said openings, a cutting tool mounted in said support, and means for causing relative feeding movement between said valve head and cutting tool.

5. A valve body having a plurality of openings therein, a valve spindle secured within one of said openings in the body, a valve head secured to said spindle, a cutting tool secured within another of said openings and means for feeding the valve head against said tool for rotating it in contact therewith.

6. A valve body having a plurality of openings therein, a sleeve mounted in one of said openings in the body and having feeding movement therein, a valve spindle secured within said sleeve and having a rotative movement independently thereof, a valve head at the end of the spindle, and a cutting tool located in another of said openings to engage said head.

7. The method of reforming a valve seat that consists in securing a cutter on the valve spindle adjacent to and as an addition to the entire structure including the valve head, and then imparting feeding movement to said cutter with respect to said seat and also imparting rotative movement to the cutter for cutting action.

8. The method of refitting a valve seat that consists in providing the valve spindle with a tip to receive a cutting tool in addition to the valve head on said spindle, inserting a regular tool through said opening in the valve case apart from the valve spindle opening and securing said tool to said tip when properly positioned, and then causing feeding and cutting movement to be imparted to said spindle.

9. The process of recutting the seat on a valve head that consists in providing a valve case with an opening in one side, supporting a cutting tool in said opening, and causing feeding and cutting movement to be imparted to said spindle while said head is in contact with said cutter.

10. A valve body having a valve seat, a valve spindle comprising an operative part of the valve mounted in the body, a valve head to fit said seat and prevent the flow of fluid thereat, a projecting tip at the end of said spindle to receive a cutting tool, means for imparting opening and closing movement to said spindle, and means for imparting separate rotating movement thereto.

GEORGE B. McCRACKEN.